(12) United States Patent
Lin

(10) Patent No.: US 9,025,234 B2
(45) Date of Patent: *May 5, 2015

(54) LUMINANCE ENHANCEMENT STRUCTURE WITH VARYING PITCHES

(75) Inventor: Craig Lin, San Jose, CA (US)

(73) Assignee: E Ink California, LLC, Fremont, CA (US)

(*) Notice: Subject to any disclaimer, the term of this patent is extended or adjusted under 35 U.S.C. 154(b) by 423 days.

This patent is subject to a terminal disclaimer.

(21) Appl. No.: 12/690,847

(22) Filed: Jan. 20, 2010

(65) Prior Publication Data

US 2010/0182351 A1   Jul. 22, 2010

Related U.S. Application Data

(60) Provisional application No. 61/146,552, filed on Jan. 22, 2009.

(51) Int. Cl.
| | | |
|---|---|---|
| *G02B 26/00* | (2006.01) | |
| *G02F 1/03* | (2006.01) | |
| *G02F 1/29* | (2006.01) | |
| *G09G 3/04* | (2006.01) | |
| *G09G 3/34* | (2006.01) | |
| *G02F 1/1343* | (2006.01) | |
| *G02F 1/167* | (2006.01) | |
| *G02F 1/1335* | (2006.01) | |
| *G02B 27/60* | (2006.01) | |

(52) U.S. Cl.
CPC ............ *G02F 1/167* (2013.01); *G02B 27/60* (2013.01); *G02F 1/133504* (2013.01); *G02F 2001/133562* (2013.01)

(58) Field of Classification Search
USPC .............. 345/107; 349/95, 62–65; 359/831; 385/146; 362/97.1–97.4, 617, 619, 620
See application file for complete search history.

(56) References Cited

U.S. PATENT DOCUMENTS

| | | |
|---|---|---|
| 4,083,626 A | 4/1978 | Miyahara et al. |
| 5,151,801 A | 9/1992 | Hiroshima |
| 6,144,430 A | 11/2000 | Kuo |
| 6,166,787 A | 12/2000 | Akins et al. |
| 6,277,263 B1 | 8/2001 | Chen |
| 6,327,013 B1 | 12/2001 | Tombling et al. |
| 6,474,826 B1 | 11/2002 | Tanaka et al. |
| 6,556,261 B1 | 4/2003 | Krusius et al. |
| 6,565,729 B2 | 5/2003 | Chen et al. |

(Continued)

FOREIGN PATENT DOCUMENTS

| | | |
|---|---|---|
| JP | 2001-264819 | 9/2001 |
| WO | WO 01/67171 | 9/2001 |

(Continued)

OTHER PUBLICATIONS

U.S. Appl. No. 12/323,300, filed Nov. 25, 2008, Sprague et al.

(Continued)

*Primary Examiner* — Ryan A Lubit
(74) *Attorney, Agent, or Firm* — Perkins Coie LLP

(57) ABSTRACT

The present invention is directed to luminance enhancement structure for reflective display devices. The luminance enhancement structure comprises columns and grooves, wherein said grooves have a triangular cross-section and the pitches of the structure vary. The structure not only can enhance the brightness of a display device, but also can reduce the Moiré effect of the display device.

17 Claims, 12 Drawing Sheets

Viewing Side

(56) References Cited

U.S. PATENT DOCUMENTS

| | | | |
|---|---|---|---|
| 6,753,064 B1 | 6/2004 | Nakama et al. | |
| 6,784,962 B2 | 8/2004 | Sumida et al. | |
| 6,930,818 B1* | 8/2005 | Liang et al. | 345/107 |
| 6,940,569 B2 | 9/2005 | Tanaka et al. | |
| 6,997,595 B2 | 2/2006 | Mi et al. | |
| 7,061,569 B2 | 6/2006 | Yun et al. | |
| 7,088,404 B2 | 8/2006 | Otake et al. | |
| 7,160,017 B2 | 1/2007 | Lee et al. | |
| 7,184,188 B2 | 2/2007 | Kamijima | |
| 7,244,476 B2 | 7/2007 | Sumida et al. | |
| 7,248,394 B2 | 7/2007 | Ding et al. | |
| 7,286,197 B2 | 10/2007 | Kwon et al. | |
| 7,294,866 B2 | 11/2007 | Liu | |
| 7,332,066 B2 | 2/2008 | Chen et al. | |
| 7,339,716 B2 | 3/2008 | Ding et al. | |
| 7,342,556 B2 | 3/2008 | Oue et al. | |
| 7,397,619 B2 | 7/2008 | Hwang et al. | |
| 7,408,696 B2 | 8/2008 | Liang et al. | |
| 7,463,317 B2 | 12/2008 | Takizawa et al. | |
| 7,543,973 B2 | 6/2009 | Shimura | |
| 7,564,519 B2 | 7/2009 | Takizawa | |
| 7,576,914 B2 | 8/2009 | Goto | |
| 7,612,846 B2 | 11/2009 | Takizawa et al. | |
| 7,638,808 B2 | 12/2009 | Owen et al. | |
| 7,667,785 B2 | 2/2010 | Van Gorkom et al. | |
| 7,693,389 B2 | 4/2010 | Kamijima | |
| 7,830,592 B1 | 11/2010 | Sprague et al. | |
| 7,952,792 B2 | 5/2011 | Van Abeelen et al. | |
| 2001/0006409 A1 | 7/2001 | Lee | |
| 2001/0026347 A1 | 10/2001 | Sawasaki et al. | |
| 2001/0026445 A1 | 10/2001 | Naghi et al. | |
| 2002/0033927 A1 | 3/2002 | Mun et al. | |
| 2002/0057413 A1 | 5/2002 | Sumida et al. | |
| 2002/0180909 A1 | 12/2002 | Lubart et al. | |
| 2003/0165016 A1 | 9/2003 | Whitehead et al. | |
| 2003/0234900 A1 | 12/2003 | Kim | |
| 2004/0125592 A1* | 7/2004 | Nagakubo et al. | 362/31 |
| 2005/0003108 A1 | 1/2005 | Sumida et al. | |
| 2005/0041311 A1* | 2/2005 | Mi et al. | 359/831 |
| 2005/0140846 A1 | 6/2005 | Lubart et al. | |
| 2005/0141844 A1* | 6/2005 | Olczak | 385/146 |
| 2006/0034099 A1 | 2/2006 | Yang et al. | |
| 2006/0055627 A1 | 3/2006 | Wilson | |
| 2006/0103779 A1 | 5/2006 | Amemiya et al. | |
| 2006/0291247 A1 | 12/2006 | Kao et al. | |
| 2007/0063965 A1* | 3/2007 | Kawai | 345/107 |
| 2007/0152592 A1 | 7/2007 | Kim et al. | |
| 2007/0160811 A1 | 7/2007 | Gaides et al. | |
| 2007/0174103 A1 | 7/2007 | Hargrave et al. | |
| 2007/0200975 A1* | 8/2007 | Kamijima | 349/95 |
| 2007/0253072 A1 | 11/2007 | Mullen et al. | |
| 2008/0012034 A1 | 1/2008 | Thielen et al. | |
| 2008/0055270 A1* | 3/2008 | Cho et al. | 345/173 |
| 2009/0097273 A1 | 4/2009 | Chang | |
| 2009/0231245 A1 | 9/2009 | Lin | |
| 2010/0141573 A1 | 6/2010 | Lin | |
| 2010/0177396 A1 | 7/2010 | Lin | |
| 2010/0182351 A1 | 7/2010 | Lin | |
| 2010/0225999 A1 | 9/2010 | Lin et al. | |
| 2010/0271407 A1 | 10/2010 | Ho et al. | |
| 2011/0043894 A1 | 2/2011 | Sprague et al. | |
| 2011/0057927 A1 | 3/2011 | Lin | |

FOREIGN PATENT DOCUMENTS

| | | |
|---|---|---|
| WO | WO 2008/0122927 | 10/2008 |
| WO | WO 2008-122927 | 10/2008 |
| WO | WO 2009/0114361 | 9/2009 |

OTHER PUBLICATIONS

Allen, K. (Oct. 2003). Electrophoretics Fulfilled. *Emerging Displays Review: Emerging Display Technologies, Monthly Report*—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Application and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*, Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

(56) References Cited

OTHER PUBLICATIONS

Liang, R.C., Hou, J., Zang, H.M., & Chung, J. (Fed. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE- IS&T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State. University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) Monochrome and Area Color Microcup®EPDs by Roll-to-Roll. *Manufacturing Process*. Presentation conducted at the Forth Organic Electronics Conference and Exhibition (OEC-06), Sep. 25-27, 2006, Frankfurt, Germany.

Zang, HM., Wang, F., Lang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

U.S. Appl. No. 12/323,315, filed Nov. 25, 2008, Sprague et al.
U.S. Appl. No. 12/837,350, filed Jan. 15, 2010, Sprague et al.
U.S. Appl. No. 12/843,396, filed Jul. 26, 2010, Sprague et al.

\* cited by examiner

LUMINANCE ENHANCEMENT STRUCTURE WITH VARYING PITCHES

This application claims priority to U.S. Provisional Application No. 61/146,552, filed Jan. 22, 2009; the content of which is incorporated herein by reference in its entirety.

FIELD OF THE INVENTION

The present invention is directed to a luminance enhancement structure for reflective display devices. The structure not only can enhance the brightness of a display device; but also can reduce the Moiré pattern effect.

BACKGROUND OF THE INVENTION

The lack of satisfactory brightness is often a concern for electrophoretic display devices. Total internal reflection would occur with electrophoretic display devices due to the fact that the display device usually has components of a high refractive index. Because of the components having a higher refractive index (e.g., about 1.5) than the air (which has a refractive index of about 1) surrounding the display panel, some of the scattering light from the display panel may reflect back to the display device by total internal reflection. This total internal reflection phenomenon could result in a loss of about 30-50% of the scattering light, thus causing reduction in brightness.

A luminance enhancement structure can be used to enhance the brightness of an electrophoretic display. However, when a luminance enhancement structure is applied onto an electrophoretic display, the Moiré effect may occur which could significantly affect the quality of the images displayed. The Moiré effect may be avoided by designing different luminance enhancement structures for different display devices, depending on the size and shape of the display cells of the display device. In other words, depending on the size and shape of its display cells (or other equivalent repeated patterns, such as active matrix backplane), each display device has to have a customized luminance enhancement structure to avoid the Moiré effect. Such an approach obviously is not desirable because it could be costly.

SUMMARY OF THE INVENTION

The present invention is directed to a luminance enhancement structure which not only can enhance the brightness of a display device, but also can reduce the Moiré effect, regardless of the size and shape of the display cells in the display device. Moreover, the luminance enhancement structure of the present invention has the additional advantage that the brightness of the display device may change depending on the angle of the light source, in a more uniform manner.

The first aspect of the invention is directed to a luminance enhancement structure which comprises columns and grooves wherein the grooves have a triangular cross-section and the pitches of the structure vary. There are many embodiments of this aspect of the invention. In one embodiment, the apex angles of the triangular cross-section are substantially equal. In one embodiment, the widths of the top surface of the columns are substantially equal. In one embodiment, the widths of the open side of the triangular cross-section of the grooves vary. In one embodiment, the surface of the grooves is optically flat and optionally coated with a metal layer. In one embodiment, the enhancement structure has a thickness in the range of about 10 μm to about 200 μm. In one embodiment, the structure is formed from a material having a refractive index of about 1.4 to about 1.7. In one embodiment, the structure has a one dimensional configuration. In another embodiment, the structure has a two dimensional configuration. In one embodiment, the pitch variance is of a fixed pattern. In another embodiment, the same fixed pattern is not repeated for at least 20 grooves. In one embodiment, the pitch variance is random or pseudo-random. In a further embodiment, the pitch variance is a combination of random and fixed patterns.

The second aspect of the invention is directed to a display device which comprises an array of microcups and a luminance enhancement structure on the viewing side of the display device wherein the luminance enhancement structure comprises columns and grooves and the grooves have a triangular cross-section and the pitches of the structure vary. There are many embodiments of this aspect of the invention. In one embodiment, the apex angles of the triangular cross-section are substantially equal. In one embodiment, the widths of the top surface of the columns are substantially equal. In one embodiment, the widths of the open side of the triangular cross-section of the grooves vary. In one embodiment, the surface of the grooves is optically flat and optionally coated with a metal layer. In one embodiment, the microcups are filled with an electrophoretic fluid. In one embodiment, the display device further comprises two electrode layers. In one embodiment, one of the electrode layers comprises thin film transistor pixel electrodes. In one embodiment, one of the electrode layers is a patterned segment electrode layer.

The non-regularity design of the present invention causes every column to redirect the light by a different factor, resulting in a different viewing angle distribution for every column, which are then combined to form a more uniform changing viewing angle for the luminance enhancement structure.

BRIEF DISCUSSION OF THE DRAWINGS

DETAILED DESCRIPTION OF THE INVENTION

I. Definitions

The technical term "total internal reflection" used in this application refers to an optical phenomenon that occurs when a ray of light strikes a medium boundary at an angle greater than the critical angle with respect to the normal axis to the surface. This can only occur where light travels from a medium with a higher refractive index to one with a lower refractive index.

Generally speaking, when a ray of light crosses a boundary between materials with different refractive indices, the light will be partially refracted at the boundary surface, and partially reflected. However, if the angle of incidence is greater than the critical angle, the light will stop crossing the boundary and instead be totally reflected back.

The critical angle is calculated based on the equation of Snell's law: $C=\sin^{-1}(n2/n1)$ wherein n1 and n2 are the refractive indices of the two different media, with n1 being the higher refractive index and n2 being the lower refractive index.

The term "Moiré pattern" is a pattern created by stacking one layer having a repetitive pattern on top of another layer also having a repetitive pattern. The two repeated patterns may be different. For example, a Moiré pattern may become visible when a microcup layer is placed on top of a TFT (thin film transistor) layer.

The term "about," as used herein, refers to ±15% of the recited value.

II. Display Devices

Figure 1:
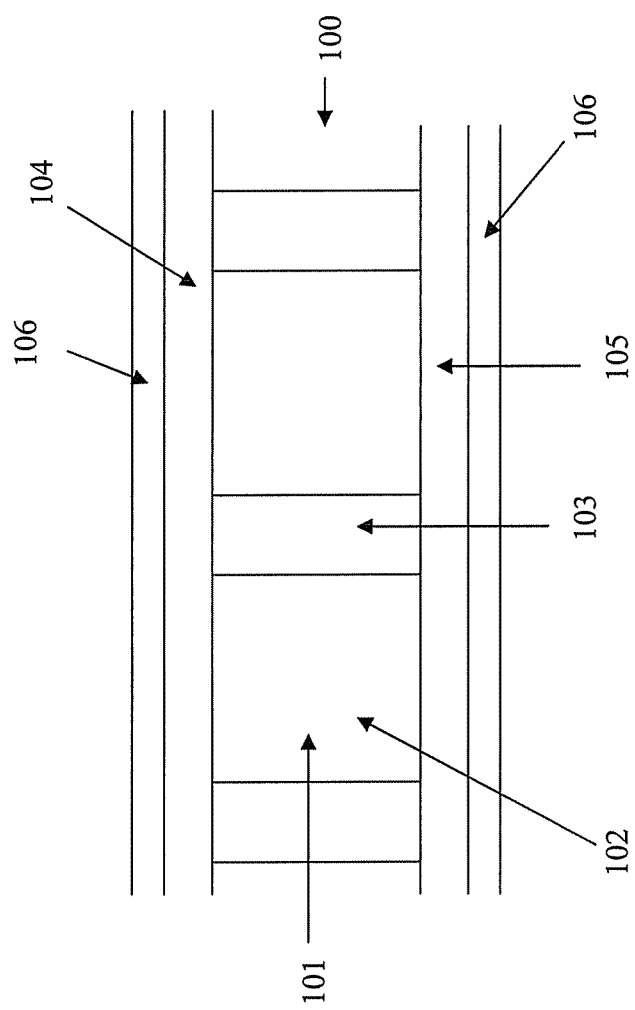
FIG. 1 illustrates a display device.

FIG. 1 illustrates a display device (100). The device comprises an array of display cells (101) filled with a display fluid (102). Each of the display cells is surrounded by partition walls (103). The array of display cells is sandwiched between two electrode layers (104 and 105).

For an electrophoretic display panel, the display cells are filled with an electrophoretic fluid which comprises charged pigment particles dispersed in a solvent. The display fluid may be a system comprising one or two types of particles.

In the system comprising only one type of particles, the charged pigment particles are dispersed in a solvent of a contrasting color. The charged particles will be drawn to one of the electrode layers (104 or 105), depending on the charge of the particles and the potential difference of the two electrode layers, thus causing the display panel to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, on the viewing side. In this case, the particles may be dispersed in a clear solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers.

The electrode layers are usually Rained on a substrate layer (106) [(such as polyethylene terephthalate (PET)). The thickness of the substrate layer (106) is usually between about 5 µm to about 175 µm, more preferably between about 5 µm to about 50 µm. The substrate layer may also be a glass layer.

The display cells may also be of a conventional walled or partition type, a microencapsulated type or a microcup type.

For a microcup-based display device disclosed in U.S. Pat. No. 6,930,818, the content of which is incorporated herein by reference in its entirety, the filled display cells are sealed with a polymeric sealing layer. Such a display device may be viewed from the sealing layer side or the side opposite the sealing layer side, depending on the transparency of the materials used and the application. The display cells may also be referred to as "microcups".

In general, the term "display cell" is intended to refer to a micro-container which is individually filled with a display fluid. Examples of "display cell" include, but are not limited to, microcups, microcapsules, micro-channels, other partition-typed display cells and equivalents thereof.

III. The Luminance Enhancement Structure

Figure 2A:
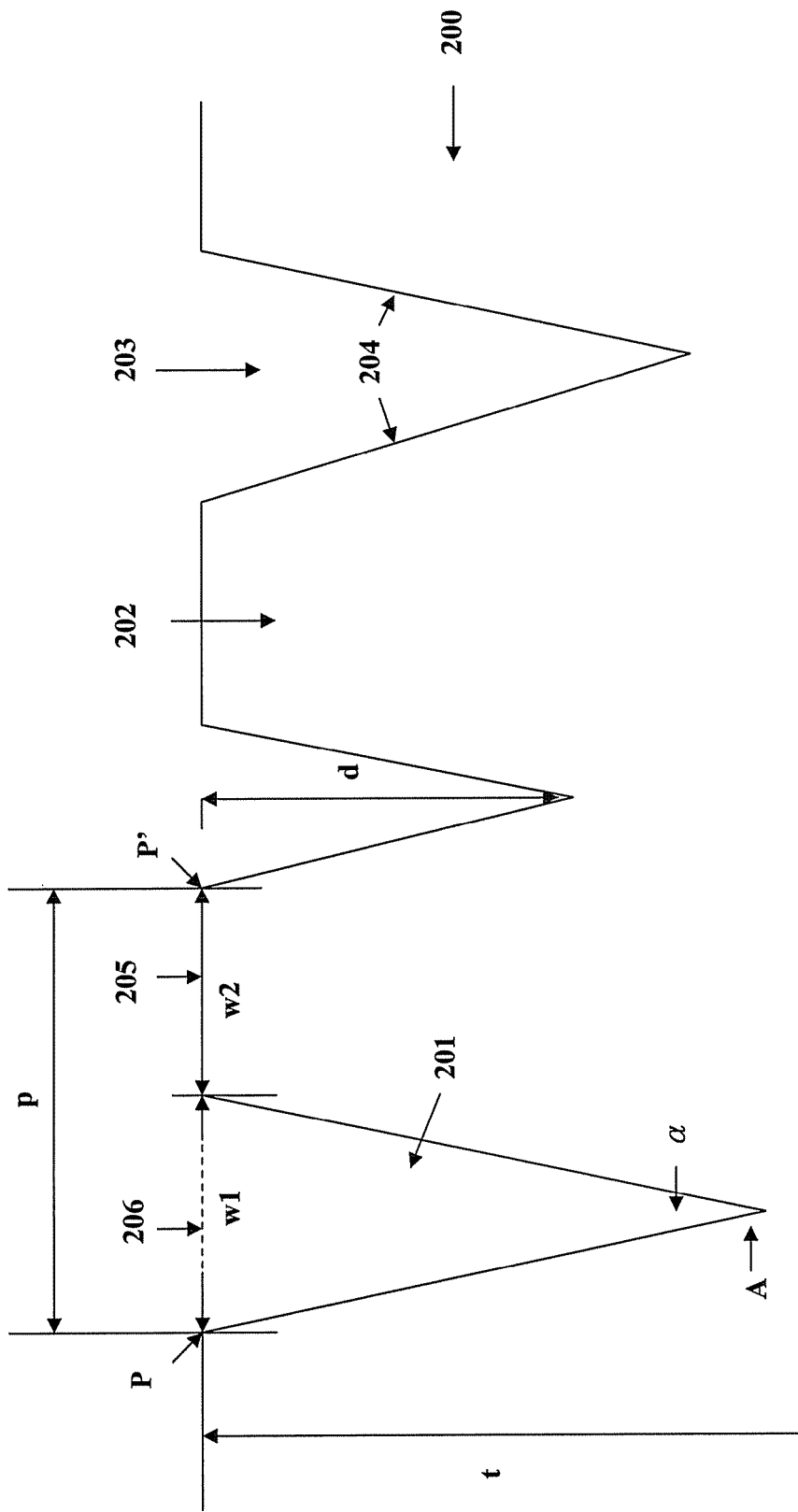
FIG. 2a depicts a luminance enhancement structure of the present invention.

FIG. 2a is a cross-section view of a luminance enhancement structure (200) of the present invention. There are multiple columns (202) and grooves (203) across the structure.

The grooves (203) and the columns (202) are in alternating order.

The groove has a triangular cross-section (201), an apex angle α and a top point A. The surface (204) of the grooves is optically flat and may optionally be coated with a metal layer. In the context of this application, the terms "groove" or "grooves" refers to the groove or grooves the surface of which is either uncoated or coated. In one embodiment of the present invention, the surface of the groove or grooves is preferably uncoated. The columns (202) have a top surface (205).

The term pitch ("p"), in the context of the present application, is defined as the distance between one point (P) on the edge of the open side (206) of the triangular cross-section (201) of one groove and the corresponding point (P') of the next groove. In other words, the term "pitch" is the sum of the width (w1) of the open side (206) of the triangular cross-section (201) of the groove (203) and the width (w2) of the top surface (205) of the column (202).

In the context of the present invention, while the pitch varies, both the width (w2) of the top surface (205) of the columns (202) and the apex angle α of the grooves remain constant. To achieve such a configuration, the width (w1) of the open side (206) of the triangular cross-section (201) of the groove (203) and the depth ("d") of the groove (203) may vary from one groove to another groove.

In the context of the present invention, the width (w2) of the top surface (205) of the columns (202) and the apex angle α of the grooves, as stated, are required to remain constant.

However, depending on the manufacturing technique used, these two parameters in a luminance structure may have slight variances. Therefore the term "substantially constant" or "substantially equal" when referring to the apex angle α or the width (w2) of the top surface of the columns, is intended to refer to the fact that the variances for the angle or the width are within the range of manufacturing tolerances.

The depth "d" of a single groove, along its longitudinal axis, remains substantially constant. In one embodiment, the depth "d" of a single groove, along its longitudinal axis, remains constant. In another embodiment, depending on the manufacturing method used and the size of the luminance enhancement structure, it is possible that the depth "d" of a single groove may vary slightly, for example, varying 5% within 10-20 cm, or alternatively, varying 3% within 10-20 cm.

The total thickness ("t") of the luminance enhancement structure, however, is consistent throughout the structure. The thickness is in the range of about 10 µm to about 200 µm.

Figure 2B:
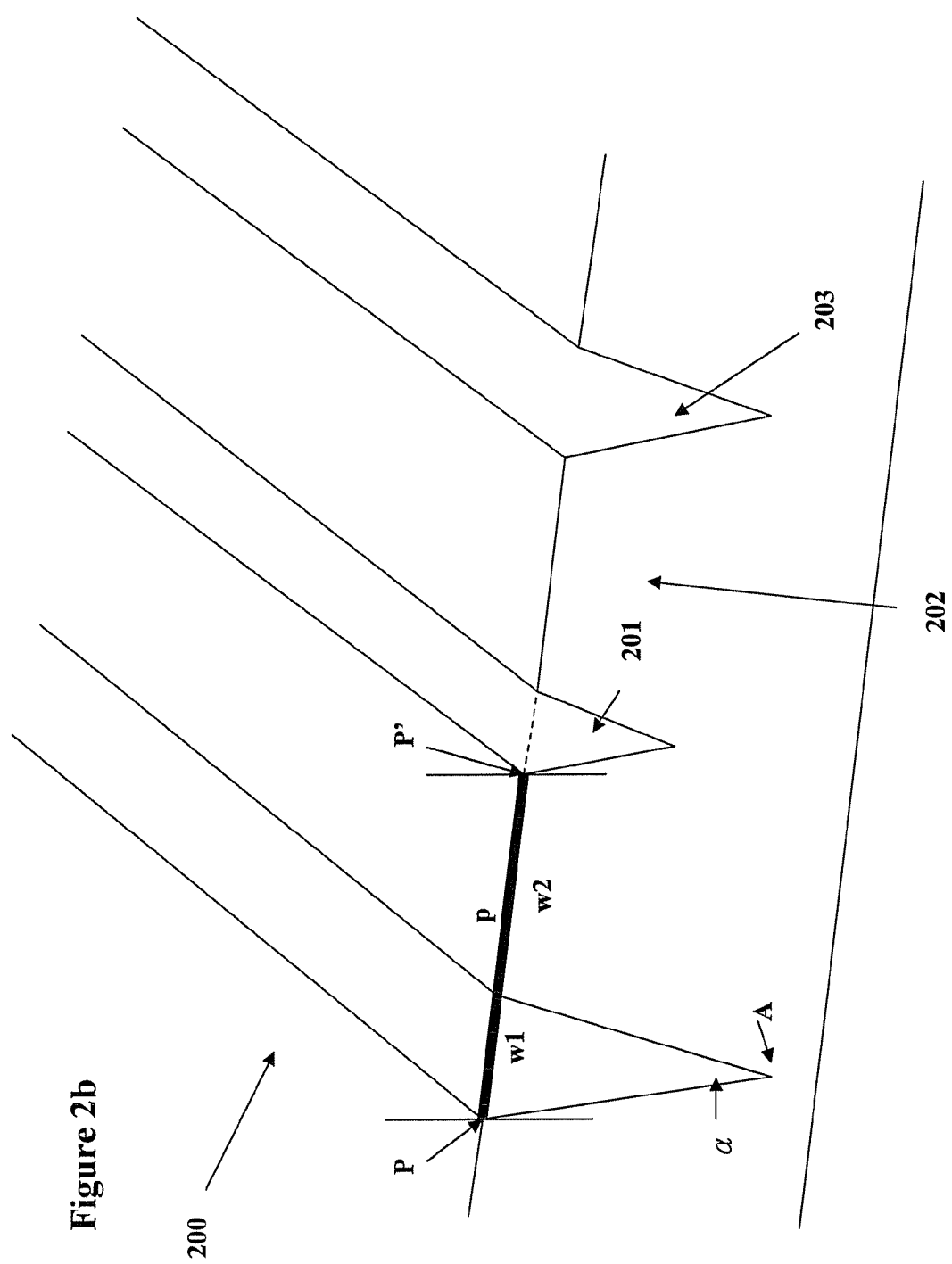
FIG. 2b shows the three-dimensional view of the luminance enhancement structure.

FIG. 2b is a three-dimensional view of the luminance enhancement structure (200).

Figure 3:
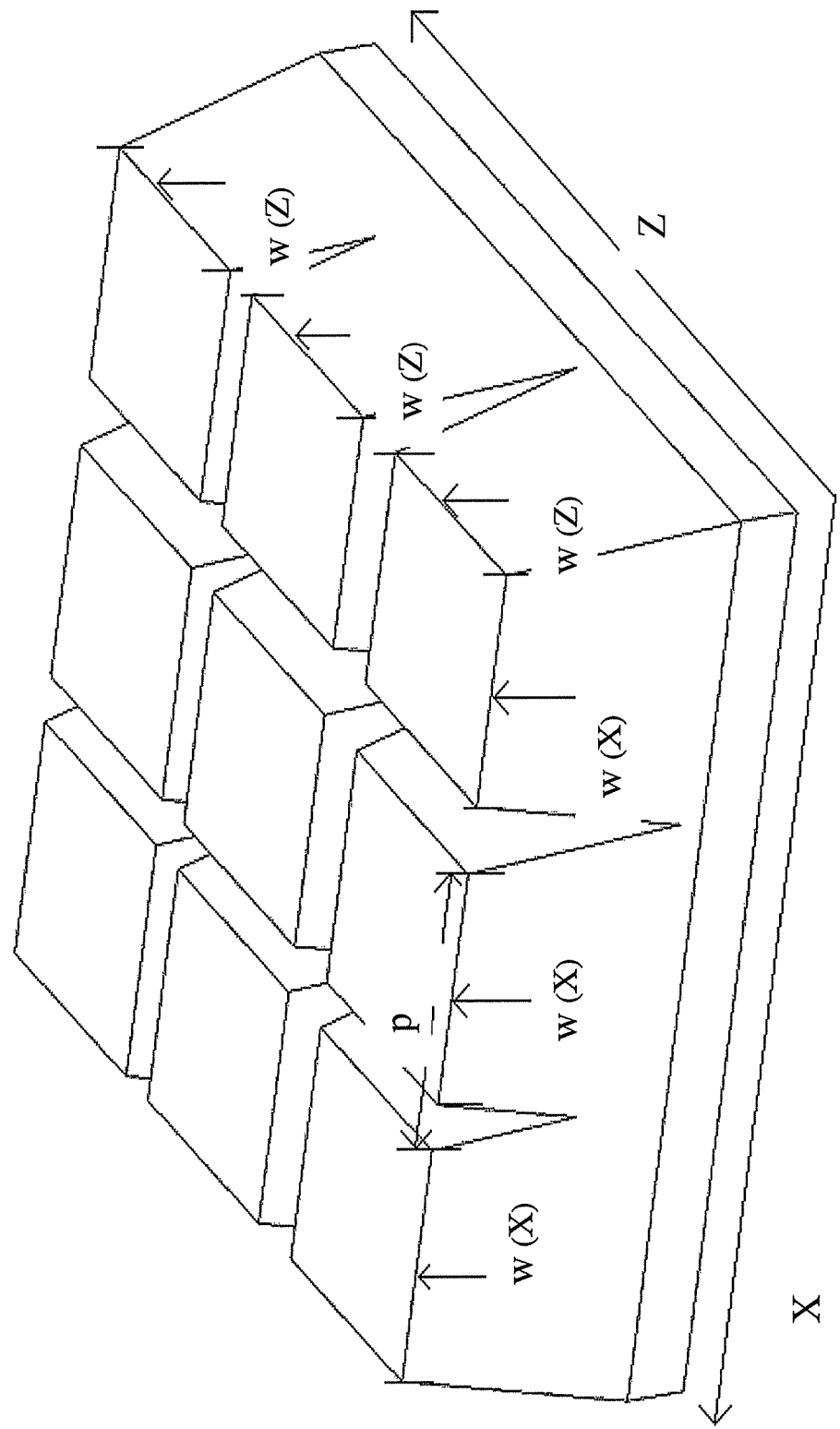
FIG. 3 shows an alternative "two dimensional" design.

While FIGS. 2a and 2b show a one-dimensional configuration, the luminance enhancement structure of the present invention may also be in the form of a two dimensional configuration as shown in FIG. 3. In the two dimensional configuration, the pitch "p" varies while the width of the top surface of the columns remains constant. It is noted that the width w(X) of the top surface of the columns in the X direction may be different from the width w(Z) of the top surface of the columns in the Z direction. As a result, the area of the top surface of the columns may be in the shape of a square (while w(X)=w(Z)) or a rectangle (while w(X)≠w(Z)). However all of the columns in the structure have a top surface area of the same size. All of the grooves also have an apex angle α of substantially the same size. The depth of grooves may vary in both the X and Z direction.

The luminance enhancement structure is formed from a material having a refractive index of about 1.4 to about 1.7. The luminance enhancement structure is transparent. The pitches may vary between about 1% to about 25%, preferably between about 1% to about 10%. In one embodiment, the pitch changes at least 1 μm within the luminance enhancement structure and, in other words, the difference between the widest pitch and the narrowest pitch within a luminance enhancement structure is at least 1 μm.

The varying pitches may have a fixed pattern for a certain number of consecutive grooves. However, in one embodiment, the same pattern would not be repeated for at least 20 grooves. For example, grooves 1-25 and grooves 26-50 may have the same varying pitch pattern.

In another embodiment, the varying pitches may be totally random or pseudo-random.

In a further embodiment, the varying pitches may be a combination of a fixed pattern and randomness.

This luminance enhancement structure of the present invention will help reduce the Moiré pattern when the luminance enhancement structure is placed on the viewing side of a display device.

IV. Dimensions of the Luminance Enhancement Structure

Figure 4A:
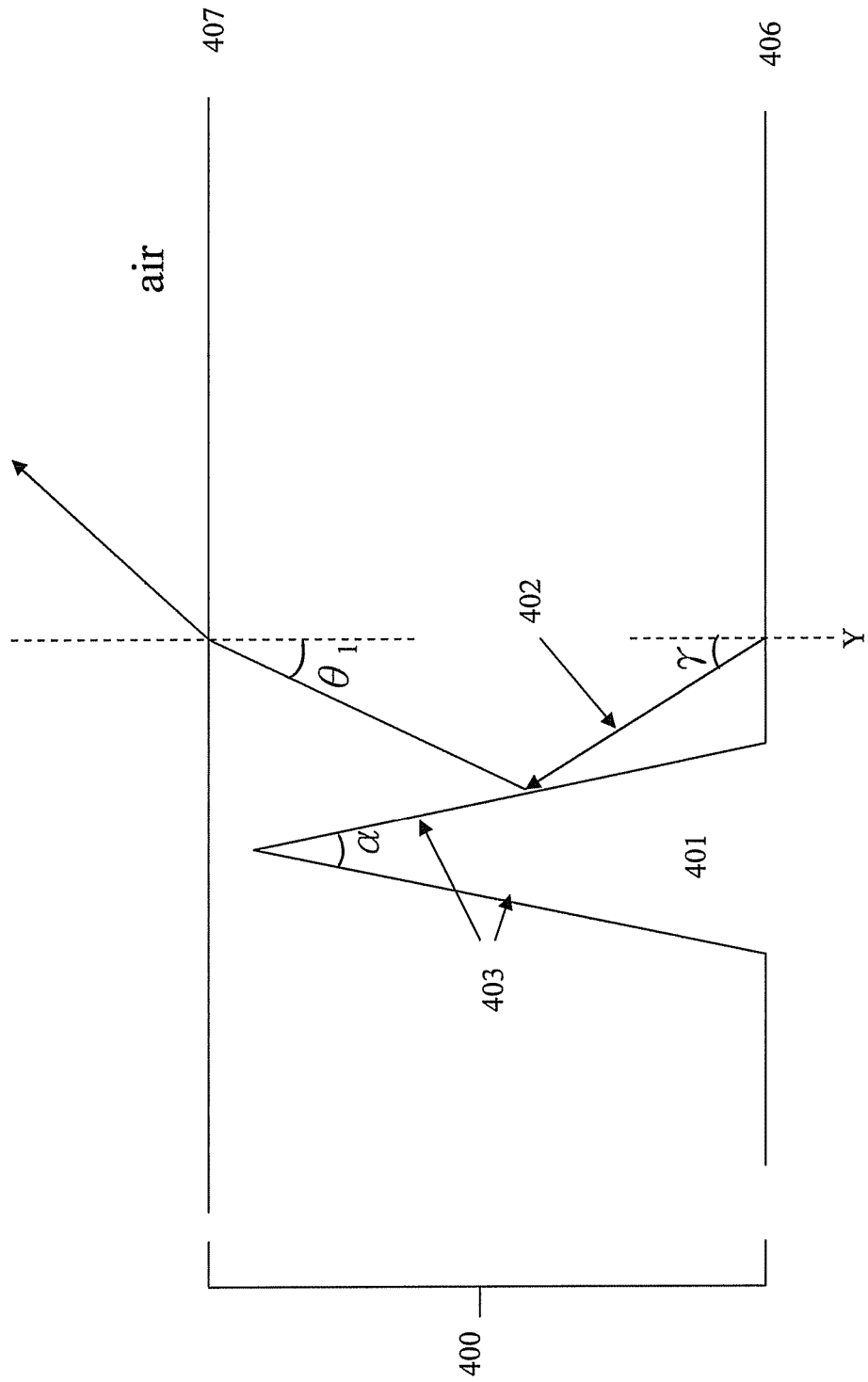
FIGS. 4a-4c illustrate the dimensions of the luminance enhancement structure.
Figure 4B:
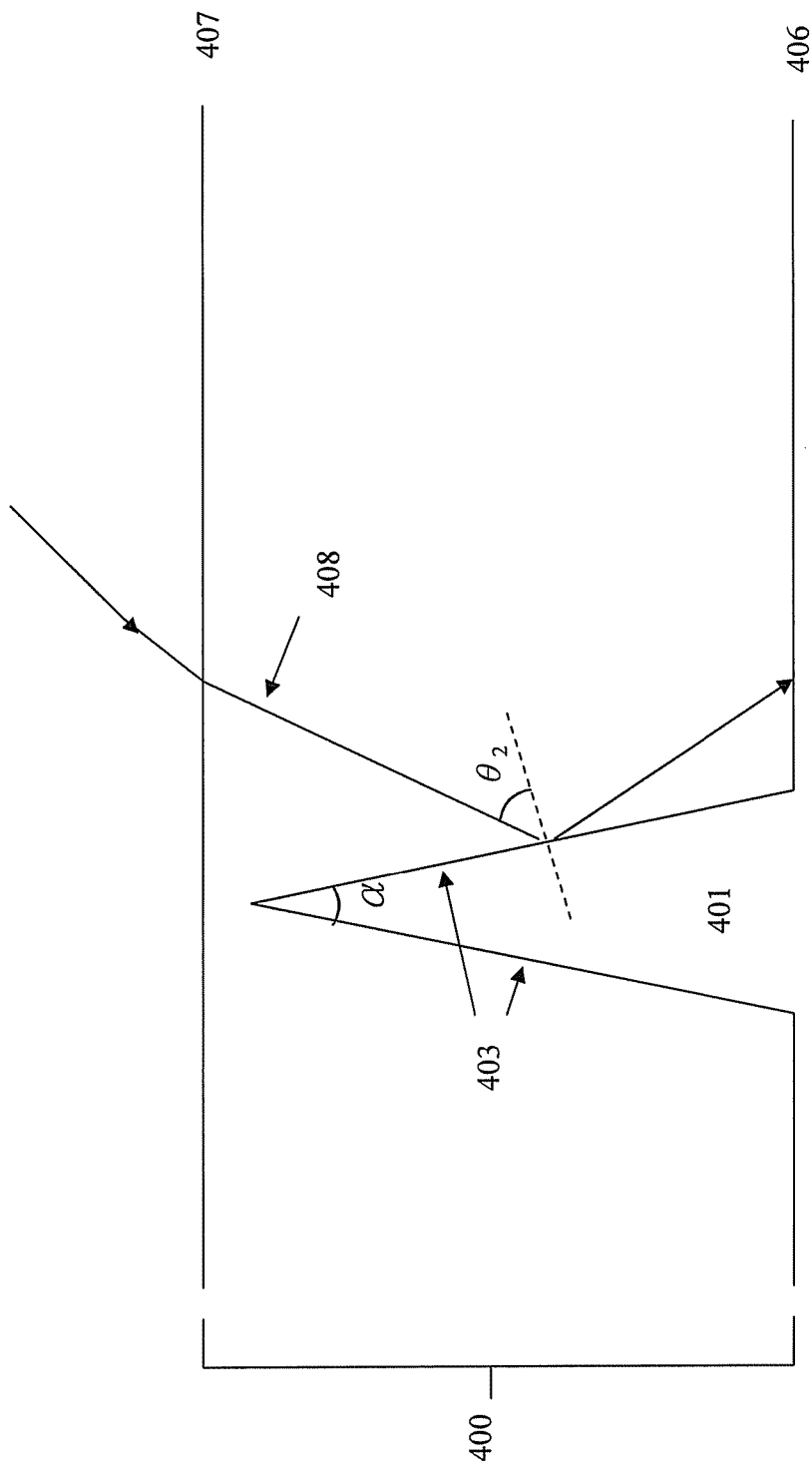
Figure 4C:
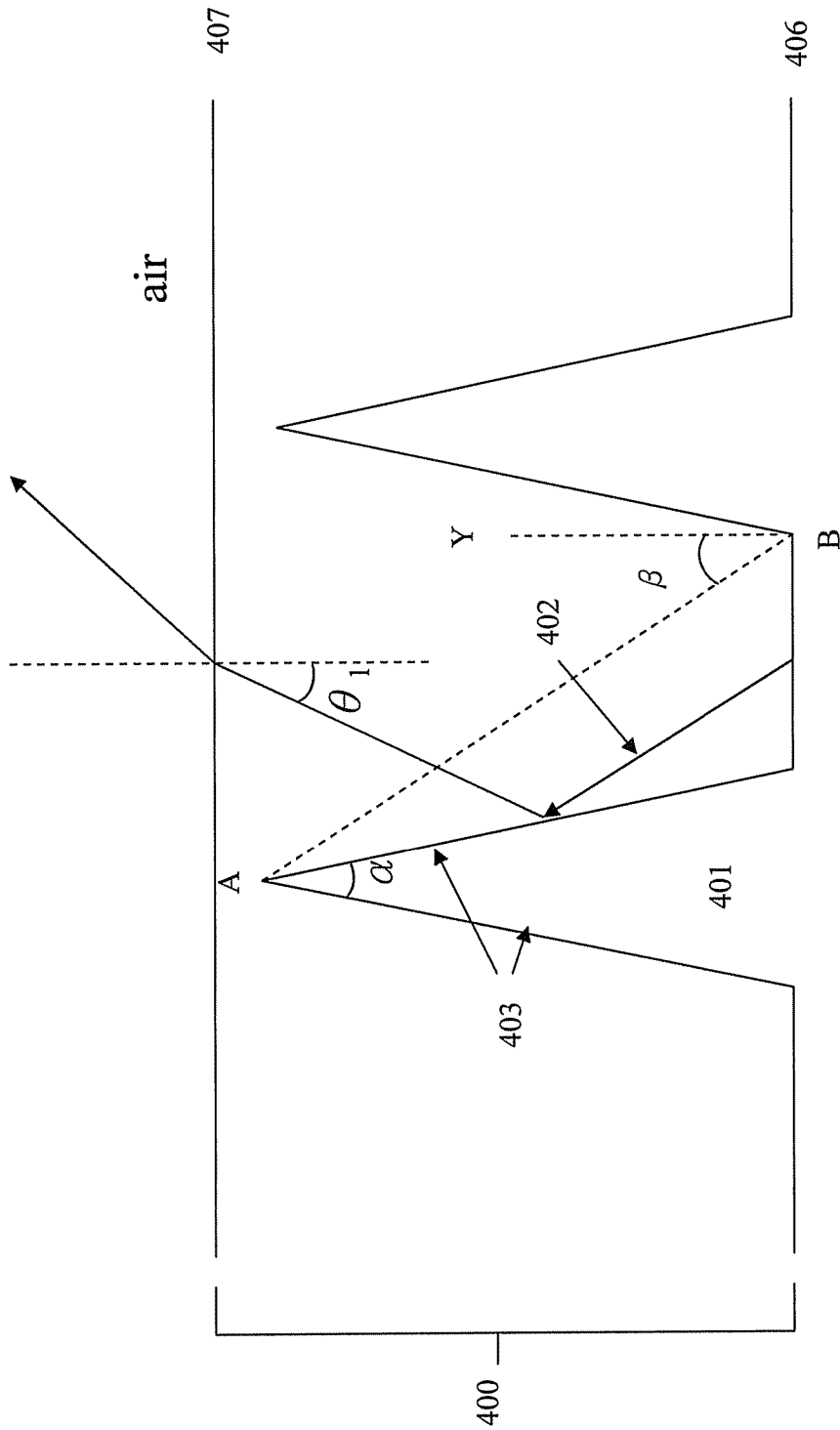

FIGS. 4a-4c illustrate the dimensions of a groove of a luminance enhancement structure of the present invention.

In FIG. 4a, it is shown that the design aims to ensure an angle of incidence $\theta_1$ to be smaller than the critical angle $C_1$ (not shown) at the boundary between the top surface (407) of the luminance enhancement structure (400) and air.

The critical angle $C_1$, in this case, is about 42° based on the refractive index of the material for the luminance enhancement structure being 1.5 and the refractive index of air surrounding the top surface of the luminance enhancement structure being 1.

As shown in FIG. 4a, the light (402) scattered from the surface (406) (i.e., 205 in FIG. 2a) is reflected at the tilted surface (403) of the groove (401) and reaches the top surface (407) of the luminance enhancement structure (400). In order for the angle of incidence ($\theta_1$) at the top surface of the luminance enhancement structure to be smaller than 42°, the apex angle α of the groove (401) is preferably in the range of 5 to 50°, more preferably in the range of 15 to 30°. As a result, the angle of incidence $\theta_1$ will be smaller than the angle γ, which reduces the chance of total internal reflection at the top surface and increases the overall optical efficiency. The angle γ is an angle at the intersection of the light (402) and the normal axis (marked Y) of the surface (406).

An incoming light (not shown) from a light source transmits through the luminance enhancement structure and strikes the display device and is then reflected with a scattering profile. The scattered light 402 in FIG. 4a is an example of such a reflected light.

FIG. 4b demonstrates that the tilted surface (403) of the groove (401) will reflect incoming light by total internal reflection. The design aims to ensure that the light striking the tilted surface (403) of the groove (401) will be reflected instead of transmitting through the space within the groove. The critical angle (not shown) at the boundary between the tilted surface (403) and the space within the groove may be calculated based on the refractive index of the material for the luminance enhancement structure and the refractive index of what is filled in the space of the groove (401). If the groove is unfilled, the refractive index of air is about 1. With the refractive index of the material for the luminance enhancement structure being about 1.5, the critical angle $C_2$ would be about 42°. When the angle of incidence $\theta_2$ of the light (408) coming from the surface (407) is greater than 42°, the light striking the tilted surface (403) will be totally internal reflected towards the surface 406 which is desired in this case because, otherwise, the light would transmit through the space in the groove.

A reflective tilted surface may be achieved by coating a metal layer over the surface of the groove. However, in one embodiment of the present invention, the surface of the grooves is uncoated.

FIG. 4c shows another design parameter, angle β, that needs to be considered. Angle β is the angle at the intersection of two lines, one of which is the line connecting the top point (A) of a first groove and the edge (B) of the base of an adjacent groove and the other line is the normal axis (marked Y) to the surface (406) of the display device. The edge (B) of the base of the adjacent groove is the closest to the first groove.

It is also noted that in a display device with a luminance enhancement structure on its top viewing side, the surface of the display device is in optical contact with the top surface of the columns of the luminance enhancement structure. Therefore the normal axis Y to the surface of the display device is also the normal axis to the top surface of the columns of the luminance enhancement structure.

Because of the varying pitches, the angle β may be led to be greater than the critical angle $C_1$ (not shown) at the boundary between the top surface (407) of the luminance enhancement structure (400) and air. As a result, the luminance enhancement effect of the structure may be reduced. However, the luminance enhancement structure of the present invention has the advantage that the enhancement effect would be less dependent on the angle of the incoming light.

V. Display Device with the Luminance Enhancement Structure

Figure 5:
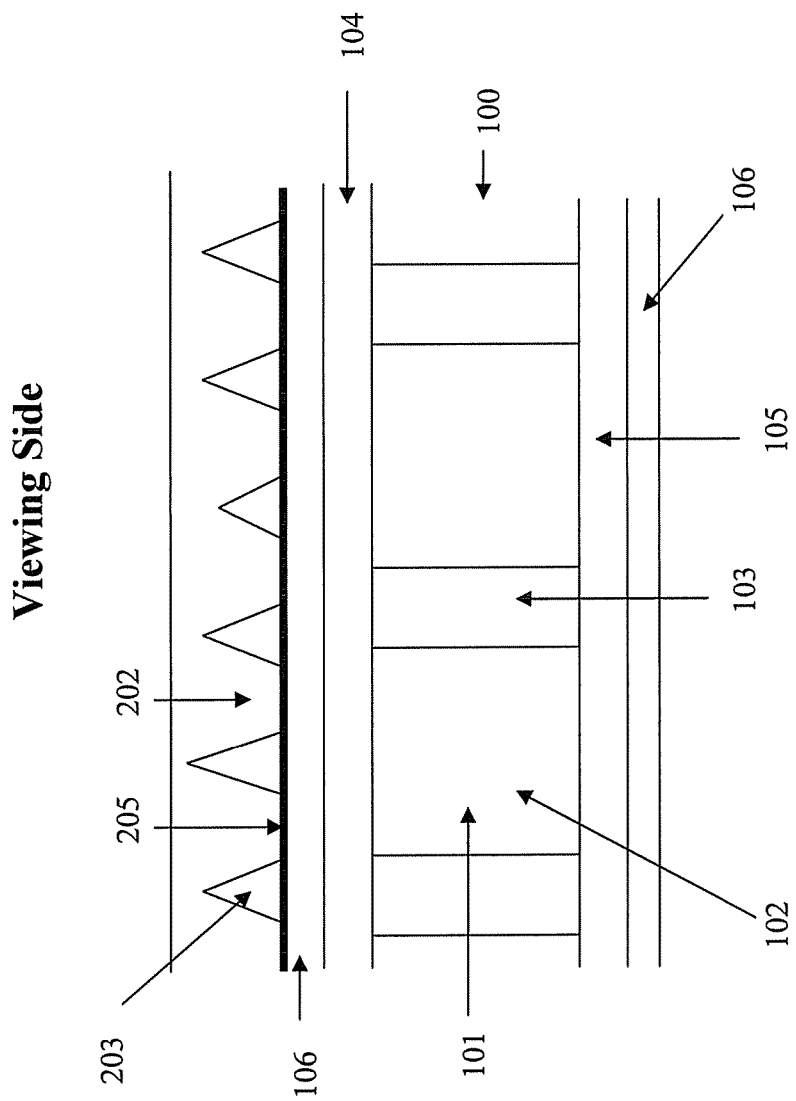
FIG. 5 depicts a display device with the luminance enhancement structure on its viewing side.

FIG. 5 depicts a cross-section view of the luminance enhancement structure on the viewing side of the display device. As shown, the luminance enhancement structure of FIG. 2a has been turned 180°, with the top surface (205) of the columns (202) now in optical contact with the substrate layer (106) of the display device, which means that there is no air gap between the top surface (205) and the substrate layer (106). This may be achieved by an optical adhesive material, such as the Norland® optical adhesive.

The space within the grooves (203) usually is filled with air. It is also possible for the space to be in a vacuum state. Alternatively, the space in the grooves (203) may be filled with a low refractive index material, the refractive index of which is lower than that of the material forming the luminance enhancement structure.

VI. Fabrication of the Luminance Enhancement Structure

The luminance enhancement structure may be fabricated in many different ways.

Figure 6A:
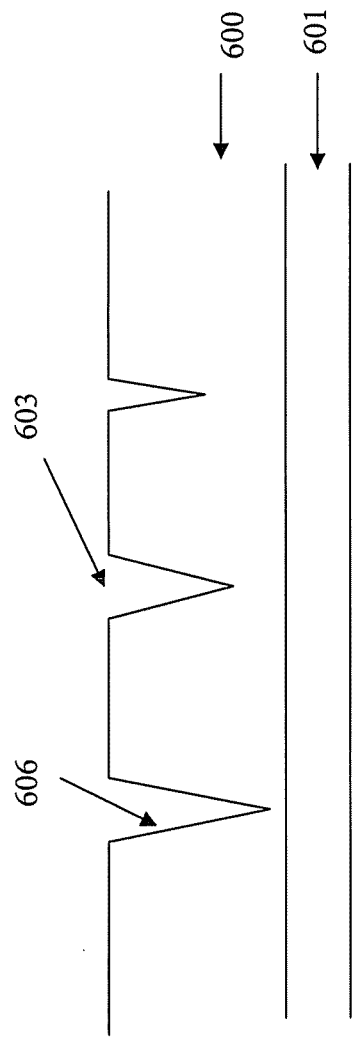
FIGS. 6a-6g illustrate the formation of a luminance enhancement structure coated with a metal layer.

In one embodiment, the luminance enhancement structure may be fabricated separately and then laminated over the viewing side of the display device. For example, the luminance enhancement structure may be fabricated by embossing as shown in FIG. 6a. The embossing process is carried out at a temperature higher than the glass transition temperature of the embossable composition (600) coated on a substrate layer (601). The embossing is usually accomplished by a mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated mold or a heated housing substrate against which the mold presses may be used to control the embossing temperature and pressure. The mold is usually formed of a metal such as nickel.

The mold is preferably manufactured by the diamond turning technique. For example, the mold may be made by diamond turning technique on a cylindrical blank known as a roll. The surface of the roll is typically of hard copper, although other materials may be used. The pattern on the mold (roll) is the opposite of the intended luminance enhancement structure. In other words, the roll will show sharp protruding patterns which are corresponding to the grooves of the luminance enhancement structure. The pattern on the roll is formed in a continuous manner around the circumference of the roll. In one embodiment, the indentations on the surface of the roll are produced by a technique known as thread cutting. In thread cutting, a single, continuous indentation is cut on the roll while the diamond cutter is moved in a direction transverse to the turning roll. If the mold to be produced has a constant pitch, during manufacture of the mold, the roll will move at a constant velocity. A typical diamond turning machine will provide independent control of the depth that the cutter penetrates the roll, the horizontal and vertical angles that the cutter makes to the roll and the transverse velocity of the cutter.

As shown in FIG. 6a, the mold creates the grooves (603) and is released during or after the embossable composition is hardened.

The hardening of the embossable composition may be accomplished by cooling, solvent evaporation, cross-linking by radiation, heat or moisture.

The refraction index of the material for forming the luminance enhancement structure is preferably greater than about 1.4, more preferably between about 1.5 and about 1.7.

The luminance enhancement structure may be used as is or further coated with a metal layer.

Figure 6B:
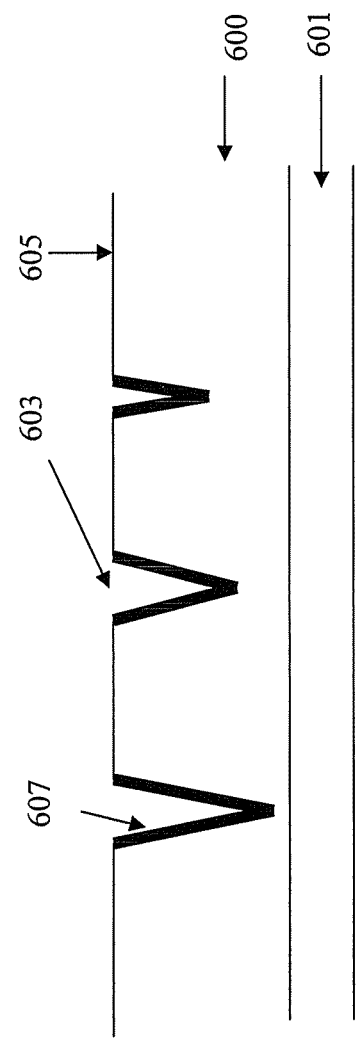

The metal layer (607) is then deposited over the surface (606) of the grooves (603) as shown in FIG. 6b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (606) of the grooves, using a variety of techniques such as sputtering, evaporation, roll transfer coating, electroless plating or the like.

Figure 6C:
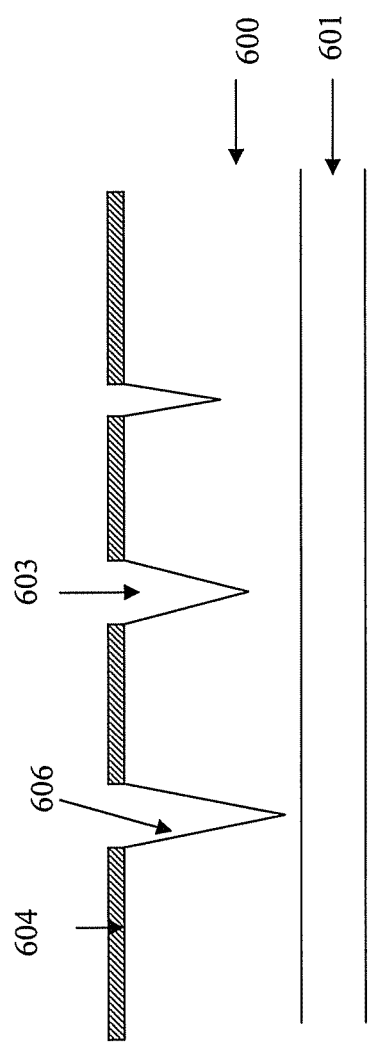

In order to facilitate formation of the metal layer only on the intended surface (i.e., the surface 606 of the grooves), a strippable masking layer may be coated before metal deposition, over the surface on which the metal layer is not to be deposited. As shown in FIG. 6c, a strippable masking layer (604) is coated onto the surface (605) between the openings of the grooves. The strippable masking layer is not coated on the surface (606) of the grooves.

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2/g$, preferably in the range of about 200 to about 400 $m^2/g$. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wetability in the coated layer.

Figure 6D:
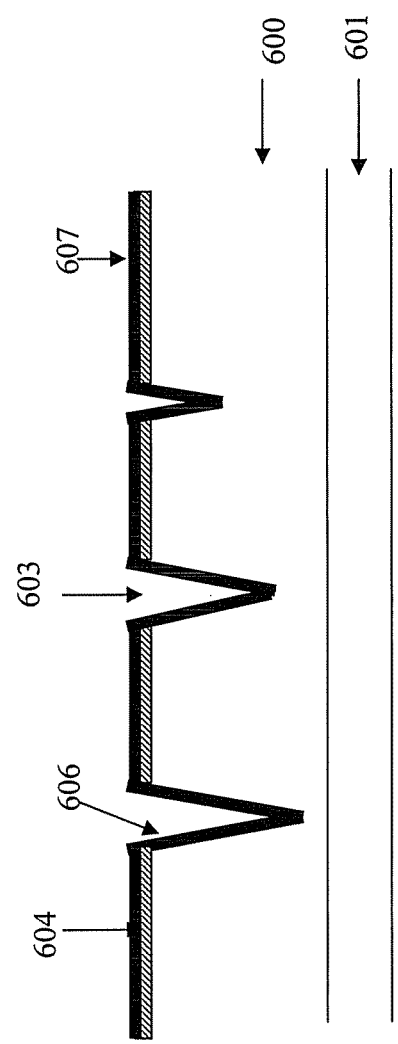

In FIG. 6d, a metal layer (607) is shown to be deposited over the entire surface, including the surface (606) of the grooves and the surface (605) between the grooves. Suitable metal materials are those as described above. The metal material must be reflective and may be deposited by a variety of techniques previously described.

Figure 6E:
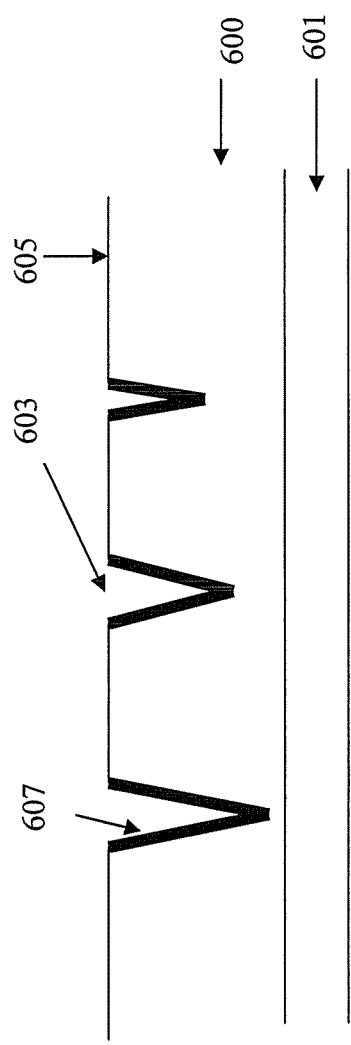

FIG. 6e shows the structure after removal of the strippable masking layer (604) with the metal layer 607 coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (604), the metal layer (607) deposited on the strippable masking layer is also removed, leaving the metal layer (607) only on the surface (606) of the grooves.

Figure 6F:
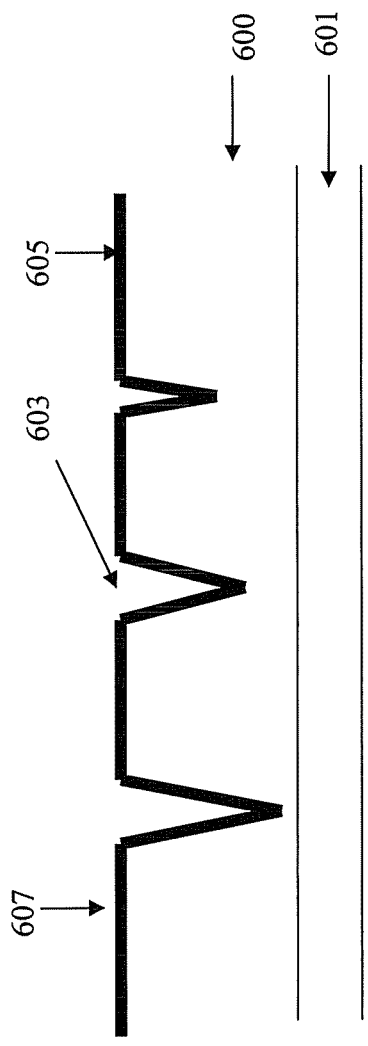
Figure 6G:
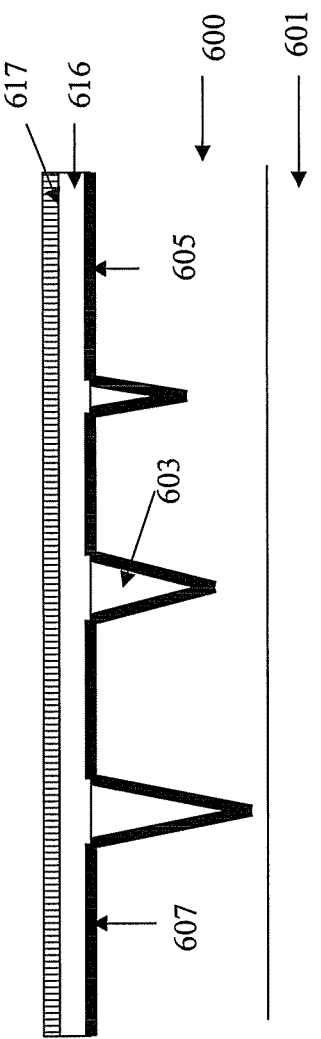

FIGS. 6f and 6g depict an alternative process for depositing the metal layer. In FIG. 6f, a metal layer (607) is deposited over the entire surface first, including both the surface (606) of the grooves and the surface (605) between the grooves. FIG. 6g shows that the film of grooves deposited with a metal layer (607) is laminated with a film (617) coated with an adhesive layer (616). The metal layer (607) on top of the surface (605) may be conveniently peeled off when the film of grooves is delaminated (separated) from the adhesive layer (616) coated film (617). The thickness of the adhesive layer (616) on the adhesive coated film is preferably in the range of about 1 to about 50 um and more preferably in the range of about 2 to about 10 um.

The luminance enhancement structure comprising grooves (uncoated or coated with a metal layer) is then laminated over a layer of display cells as described above.

The process as described above is applicable to both the one-dimensional and the two-dimensional luminance enhancement structure.

For the two dimensional version, the display cells may be formed by a self aligned process using the already formed luminance enhancement structure as a photo-mask. The method is described in U.S. patent application Ser. No. 12/323,300, filed on Nov. 25, 2008, the content of which is incorporated herein by reference in its entirety.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device assembly comprising
    i) a display device comprising display cells filled with a display fluid, and a substrate layer above the display cells, and
    ii) a luminance enhancement structure between a viewing side and the substrate layer, wherein the luminance enhancement structure comprises columns and grooves in an alternating order, and
        a) each of said columns has a planar top surface having a width;
        b) each of said grooves has a triangular cross-section and an apex angle, wherein said triangular cross-section has an open side having a width; and
        c) said structure has pitches varying between about 1% to about 25% within the structure, wherein each of the pitches is the sum of the width of the open side of the triangular cross-section of the groove and the width of the planar top surface of a neighboring column and the difference between the widest pitch and the narrowest pitch within the luminance enhancement structure is at least 1 μm, and said substrate layer is in contact with the planar top surfaces of the columns in the luminance enhancement structure;
        wherein an external light from above the luminance enhancement structure strikes a tilted surface of the grooves of the luminance enhancement structure and then the light is reflected by total internal reflection instead of transmitting through the space within the groove.

2. The display device assembly of claim 1, wherein the apex angles of the grooves are substantially equal.

3. The display device assembly of claim 1, wherein the widths of the planar top surfaces of the columns are substantially equal.

4. The display device assembly of claim 1, wherein the widths of the open sides of the triangular cross-section of the grooves vary.

5. The display device assembly of claim 1, wherein each surface of the grooves is optically flat and optionally coated with a metal layer.

6. The display device assembly of claim 1, wherein the display fluid is an electrophoretic fluid.

7. The display device assembly of claim 6, wherein the array of display cells are sandwiched between two electrode layers.

8. The display device assembly of claim 7, wherein one of the electrode layers comprises thin film transistor pixel electrodes.

9. The display device assembly of claim 7, wherein one of the electrode layers is a patterned segment electrode layer.

10. The display device assembly of claim 1, wherein the luminance enhancement structure has a consistent thickness in the range of about 10 μm to about 200 μm.

11. The display device assembly of claim 1, wherein the pitch variance is pseudo-random.

12. The display device assembly of claim 1, wherein said luminance enhancement structure is formed from a material having a refractive index of about 1.4 to about 1.7.

13. The display device assembly of claim 1, wherein the columns and grooves are arranged in a one dimensional array.

14. The display device assembly of claim 1, wherein the columns and grooves are arranged in a two dimensional array.

15. The display device assembly of claim 1, wherein the pitch variance is of a fixed pattern.

16. The display device assembly of claim 1, wherein the pitch variance is random.

17. The display device assembly of claim 1, wherein the pitch variance is a combination of random and fixed patterns.

* * * * *